(12) United States Patent
Shi

(10) Patent No.: US 11,971,497 B2
(45) Date of Patent: Apr. 30, 2024

(54) POSITIONING REFERENCE SIGNAL SENDING METHOD AND RELATED APPARATUS

(71) Applicant: Huawei Technologies Co., Ltd., Guangdong (CN)

(72) Inventor: Zhenyu Shi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 275 days.

(21) Appl. No.: 17/680,669

(22) Filed: Feb. 25, 2022

(65) Prior Publication Data

US 2022/0268873 A1     Aug. 25, 2022

Related U.S. Application Data

(63) Continuation of application No. PCT/CN2020/110588, filed on Aug. 21, 2020.

(30) Foreign Application Priority Data

Aug. 30, 2019     (CN) .......................... 201910816099.5

(51) Int. Cl.
*G01S 5/00* (2006.01)
*H04L 5/00* (2006.01)
(Continued)

(52) U.S. Cl.
CPC .......... *G01S 5/0063* (2013.01); *H04L 5/0051* (2013.01); *H04W 4/029* (2018.02); *H04W 16/28* (2013.01); *H04W 80/02* (2013.01)

(58) Field of Classification Search
CPC ... G01S 5/0063; H04L 5/0051; H04L 5/0048; H04L 5/0078; H04L 5/0094;
(Continued)

(56) References Cited

U.S. PATENT DOCUMENTS

| 11,129,127 | B2* | 9/2021 | Soriaga ............... H04W 64/003 |
| 2017/0134128 | A1 | 5/2017 | Opshaug et al. |
| 2022/0174620 | A1* | 6/2022 | Cha ....................... H04L 5/0023 |

FOREIGN PATENT DOCUMENTS

| CN | 105589506 A | 5/2016 |
| CN | 107360617 A | 11/2017 |

(Continued)

OTHER PUBLICATIONS

OPPO, Discussion on DL Reference Signals for NR Positioning. 3GPP TSG RAN WG1 #98, Prague, CZ, Aug. 26-30, 2019, R1-1908356, 6 pages.
(Continued)

*Primary Examiner* — Kabir A Timory
(74) *Attorney, Agent, or Firm* — WOMBLE BOND DICKINSON (US) LLP

(57) ABSTRACT

This application provides a positioning reference signal sending method and a related apparatus. The method includes: receiving identification information, positioning reference signal (PRS) indication information, and PRS identification information of a terminal device from a location management function network element; sending the PRS identification information to the terminal device; and sending a first PRS to the terminal device. Based on the foregoing technical solutions, the terminal device may receive a PRS of another type other than a periodic PRS. Therefore, more PRSs are used for location measurement. In this way, positioning precision can be improved.

20 Claims, 5 Drawing Sheets

(51) Int. Cl.
*H04W 4/029* (2018.01)
*H04W 16/28* (2009.01)
*H04W 80/02* (2009.01)

(58) Field of Classification Search
CPC .... H04L 5/0096; H04W 4/029; H04W 16/28; H04W 80/02; H04W 4/023; H04W 64/00; H04B 7/0695
See application file for complete search history.

(56) References Cited

FOREIGN PATENT DOCUMENTS

| | | |
|---|---|---|
| CN | 107925496 A | 4/2018 |
| EP | 3264838 A1 | 1/2018 |
| GB | 2576033 A | 2/2020 |
| WO | 2018137198 A1 | 8/2018 |

OTHER PUBLICATIONS

Qualcomm Incorporated, Considerations on Phy-layer procedures for NR Positioning. 3GPP TSG RAN WG1 #97, Reno, USA, May 13 17, 2019, R1-1907299, 10 pages.
Huawei, HiSilicon, DL RS design for NR positioning. 3GPP TSG RAN WG1 #97, Reno, USA, May 13 17, 2019, R1-1906052, 7 pages.
3GPP TS 36.211 V15.6.0 (Jun. 2019), 3rd Generation Partnership Project; Technical Specification Group Radio Access Network; Evolved Universal Terrestrial Radio Access (E-UTRA); Physical channels and modulation(Release 15), 240 pages.
Intel Corporation, Summary for AI 7.2.10.1 DL Reference Signals for NR Positioning. 3GPP TSG RAN WG1 Meeting #96bis, Xi an, China, Apr. 8 12, 2019, R1-1905651, 11 pages.
3GPP TS 36.355 V15.4.0 (Jun. 2019), 3rd Generation Partnership Project; Technical Specification Group Radio Access Network; Evolved Universal Terrestrial Radio Access (E-UTRA); LTE Positioning Protocol (LPP)(Release 15), 224 pages.
Intel Corporation, Offline Discussion Outcome on DL Reference Signals for NR Positioning. 3GPP TSG RAN WG1 Meeting #96bis, Xi an, China, Apr. 8 12, 2019, R1-1905847, 12 pages.
3GPP TS 38.214 V15.6.0 (Jun. 2019), 3rd Generation Partnership Project; Technical Specification Group Radio Access Network; NR; Physical layer procedures for data(Release 15), 105 pages.
Vivo, Discussion on DL and UL RS for NR positioning. 3GPP TSG RAN WG1 #96bis, Xi an, China, Apr. 8 12, 2019, R1-1904107, 14 pages.
3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.
3GPP TS 38.321 V15.6.0 (Jun. 2019), 3rd Generation Partnership Project; Technical Specification Group Radio Access Network; NR; Medium Access Control (MAC) protocol specification(Release 15), 78 pages.
3GPP TS 38.211 V15.6.0 (Jun. 2019), 3rd Generation Partnership Project; Technical Specification Group Radio Access Network; NR; Physical channels and modulation(Release 15), 97 pages.

* cited by examiner

| A/D | Serving cell ID | BWP ID | Byte 1 |
|---|---|---|---|
| R | IM | SP CSI-RS resource set ID | Byte 2 |
| R | R | SP CSI-IM resource set ID | Byte 3 |
| R | PRS resource ID$_0$ | | Byte 4 |
| ... | | | |
| R | PRS resource ID$_N$ | | Byte 4+N |

FIG. 3

| A/D | Serving cell ID | BWP ID | Byte 1 |
|---|---|---|---|
| R | IM | SP CSI-RS resource set ID | Byte 2 |
| R | R | SP CSI-IM resource set ID | Byte 3 |
| R | TCI-state IE$_0$ | | Byte 4 |
| ... | | | |
| R | TCI-state IE$_N$ | | Byte 4+N |

FIG. 4

POSITIONING REFERENCE SIGNAL SENDING METHOD AND RELATED APPARATUS

CROSS-REFERENCE TO RELATED APPLICATIONS

This application is a continuation of International Application No. PCT/CN2020/110588, filed on Aug. 21, 2020, which claims priority to Chinese Patent Application No. 201910816099.5, filed on Aug. 30, 2019. The disclosures of the aforementioned applications are hereby incorporated by reference in their entireties.

TECHNICAL FIELD

This application relates to the field of communication technologies, and more specifically, to a positioning reference signal sending method and a related apparatus.

BACKGROUND

In a downlink positioning scenario, if one terminal device needs to be positioned, a plurality of access network devices are required to send positioning reference signals (PRSs) to the terminal device. The terminal device may determine a location of the terminal device by using the received reference signals. For example, the terminal device may measure a time difference of arrival (TDOA) of a PRS from an access network device to the terminal device based on the received PRS and determine the location of the terminal device by using the TDOA.

Currently, the access network device sends a PRS periodically. However, a positioning result obtained by using a periodic PRS for location measurement may not satisfy required positioning precision.

SUMMARY

This application provides a positioning reference signal sending method and a related apparatus to improve positioning precision.

According to a first aspect, an embodiment of this application provides a positioning reference signal sending method. The method includes: receiving identification information, positioning reference signal (PRS) indication information, and PRS identification information of a terminal device from a location management function (LMF) network element, where the PRS indication information is used to indicate to send a first PRS to the terminal device, the PRS identification information includes an identifier of at least one second PRS, the first PRS has a quasi co-location (QCL) association relationship with one of the at least one second PRS, and a type of the first PRS does not include a periodic PRS; sending the PRS identification information to the terminal device; and sending the first PRS to the terminal device.

In some embodiments, the second PRS is a PRS that has been sent to the terminal device. In other words, the terminal device has received the second PRS before receiving the first PRS.

In some embodiments, a type of the second PRS may be a periodic PRS, an aperiodic PRS, or a semi-persistent PRS.

In the foregoing technical solution, in addition to the periodic PRS, an access network device may further send a PRS of another type to the terminal device. Therefore, more PRSs can be sent to the terminal device. Correspondingly, more PRSs can be used for location measurement. In this way, positioning precision can be improved. In addition, the first PRS has a QCL association relationship with one of the at least one second PRS. In this case, the LMF network element may notify the access network device of the identifier of the at least one second PRS. The access network device forwards the identifier of the at least one second PRS to the terminal device. In this way, the terminal device may determine, from the at least one second PRS, the second PRS having the QCL association relationship with the first PRS, to receive the first PRS based on a spatial characteristic parameter of the second PRS. In this way, the terminal device may directly receive the first PRS by using the spatial characteristic parameter of the second PRS, and may not need to re-determine the spatial characteristic parameter used to receive the first PRS.

In a possible design, when the type of the first PRS is an aperiodic PRS, the sending the PRS identification information to the terminal device includes: sending a radio resource control (RRC) layer message to the terminal device, where the RRC layer message carries the PRS identification information.

In a possible design, the RRC layer message includes a channel state information-aperiodic trigger state list information element, and the channel state information-aperiodic trigger state list information element includes the PRS identification information. In the foregoing technical solution, the channel state information-aperiodic trigger state list information element may directly carry the PRS identification information. In this way, the terminal device can be notified of the identifier of the at least one second PRS conveniently.

In a possible design, the RRC layer message includes at least one transmission configuration indication state information element, and the identifier of the at least one second PRS is separately carried in the at least one transmission configuration indication state information element. In the foregoing technical solution, an existing format of the channel state information-aperiodic trigger state list information element may not need to be modified. Instead, the identifier of the at least one second PRS is carried in the transmission configuration indication state information element. In this way, an existing protocol may only be slightly modified. In addition, the transmission configuration indication state information element may further carry a type of a QCL.

In a possible design, the method further includes: sending downlink control information (DCI) to the terminal device, where the DCI is used to indicate an identifier of a target second PRS, and the target second PRS is the second PRS having the QCL association relationship with the first PRS in the at least one second PRS. Based on the foregoing technical solution, the terminal device may determine, by using the DCI, the second PRS having the QCL association relationship with the first PRS.

In a possible design, when the type of the first PRS is a semi-persistent PRS, the sending the PRS identification information to the terminal device includes: sending a media access control (MAC) layer message to the terminal device, where the MAC layer message includes the PRS identification information.

In a possible design, the MAC layer message includes a MAC subheader, and the MAC subheader includes the PRS identification information. In the foregoing technical solution, the MAC subheader may directly carry the PRS identification information. In this way, the terminal device can be notified of the identifier of the at least one second PRS conveniently.

In a possible design, the MAC layer message includes a MAC subheader, and the MAC subheader includes at least one transmission configuration indication state information element, and the identifier of the at least one second PRS is separately carried in the at least one transmission configuration indication state information element. In the foregoing technical solution, an existing format of the MAC subheader may not need to be modified. Instead, the identifier of the at least one second PRS is carried in the transmission configuration indication state information element. In this way, an existing protocol may only be slightly modified. In addition, the transmission configuration indication state information element may further carry a type of a QCL.

In a possible design, the method further includes: sending a MAC control element (CE) to the terminal device, where the MAC CE is used to indicate an identifier of a target second PRS, and the target second PRS is the second PRS having the QCL association relationship with the first PRS in the at least one second PRS. Based on the foregoing technical solution, the terminal device may determine, by using the MAC CE, the second PRS having the QCL association relationship with the first PRS.

In a possible design, the method further includes: sending a non-zero power channel state information reference signal (NZP-CSI-RS) resource set information element to the terminal device, where the NZP-CSI-RS resource set information element includes positioning indication information, and the positioning indication information is used to indicate that a parameter included in the NZP-CSI-RS resource set information element is used for location measurement. In the foregoing technical solution, by using the existing NZP-CSI-RS resource set information element, the terminal device is notified of the parameter used for location measurement. Therefore, in the foregoing technical solution, no new information element is required to notify the parameter used for the location measurement, and an existing protocol may only be slightly modified.

According to a second aspect, an embodiment of this application provides a positioning reference signal receiving method. The method includes: receiving PRS identification information from an access network device, where the PRS identification information includes an identifier of at least one second PRS, a first PRS has a QCL association relationship with a target second PRS of the at least one second PRS, and a type of the first PRS does not include a periodic PRS; performing QCL association on the first PRS and the target second PRS to obtain a spatial characteristic parameter; and receiving the first PRS from the access network device based on the spatial characteristic parameter.

In some embodiments, the second PRS is a PRS that has been sent to the terminal device. In other words, the terminal device has received the second PRS before receiving the first PRS.

In some embodiments, a type of the second PRS may be a periodic PRS, an aperiodic PRS, or a semi-persistent PRS.

In the foregoing technical solution, in addition to a periodic PRS, the terminal device may further receive a PRS of another type. In other words, a quantity of PRSs received by the terminal device increases. Therefore, the terminal device may perform location measurement by using more PRSs. In this way, positioning precision can be improved. In addition, the terminal device may determine, from the at least one second PRS, the second PRS having the QCL association relationship with the first PRS, to receive the first PRS based on a spatial characteristic parameter of the second PRS. In this way, the terminal device may directly receive the first PRS by using the spatial characteristic parameter of the second PRS, and may not need to re-determine the spatial characteristic parameter used to receive the first PRS.

In a possible design, the receiving positioning reference signal PRS identification information from an access network device includes: receiving a RRC layer message from the access network device, where the RRC layer message carries the PRS identification information.

In a possible design, the RRC layer message includes a channel state information-aperiodic trigger state list information element, and the channel state information-aperiodic trigger state list information element includes the PRS identification information. In the foregoing technical solution, the channel state information-aperiodic trigger state list information element may directly carry the PRS identification information. In this way, the terminal device can be notified of the identifier of the at least one second PRS conveniently.

In a possible design, the RRC layer message includes at least one transmission configuration indication state information element, and the identifier of the at least one second PRS is separately carried in the at least one transmission configuration indication state information element. In the foregoing technical solution, an existing format of the channel state information-aperiodic trigger state list information element may not need to be modified. Instead, the identifier of the at least one second PRS is carried in the transmission configuration indication state information element. In this way, an existing protocol may only be slightly modified. In addition, the transmission configuration indication state information element may further carry a type of a QCL.

In a possible design, before the performing QCL association on the first PRS and the target second PRS, the method further includes: receiving DCI from the access network device, where the DCI is used to indicate an identifier of the target second PRS; and determining that the type of the first PRS is an aperiodic PRS. Based on the foregoing technical solution, the terminal device may determine, by using the DCI, the second PRS having the QCL association relationship with the first PRS.

In a possible design, the receiving the PRS identification information from an access network device includes: receiving a MAC layer message from the access network device, where the MAC layer message carries the PRS identification information.

In a possible design, the MAC layer message includes a MAC subheader, and the MAC subheader includes the PRS identification information. In the foregoing technical solution, the MAC subheader may directly carry the PRS identification information. In this way, the terminal device can be notified of the identifier of the at least one second PRS conveniently.

In a possible design, the MAC layer message includes a MAC subheader, and the MAC subheader includes at least one transmission configuration indication state information element, and the identifier of the at least one second PRS is separately carried in the at least one transmission configuration indication state information element. In the foregoing technical solution, an existing format of the MAC subheader may not need to be modified. Instead, the identifier of the at least one second PRS is carried in the transmission configuration indication state information element. In this way, an existing protocol may only be slightly modified. In addition, the transmission configuration indication state information element may further carry a type of a QCL.

In a possible design, before the performing QCL association on the first PRS and the target second PRS, the method further includes: receiving a MAC CE from the access network device, where the MAC CE is used to indicate an identifier of the target second PRS; and determining that the type of the first PRS is a semi-persistent PRS. Based on the foregoing technical solution, the terminal device may determine, by using the MAC CE, the second PRS having the QCL association relationship with the first PRS.

In a possible design, the method further includes: receiving a NZP-CSI-RS resource set information element from the access network device, where the NZP-CSI-RS resource set information element includes positioning indication information, and the positioning indication information is used to indicate that a parameter included in the NZP-CSI-RS resource set information element is used for location measurement. In the foregoing technical solution, by using the existing NZP-CSI-RS resource set information element, the terminal device is notified of the parameter used for location measurement. Therefore, in the foregoing technical solution, no new information element is required to notify the parameter used for the location measurement, and an existing protocol may only be slightly modified.

According to a third aspect, an embodiment of this application provides a positioning reference signal sending method. The method includes: sending identification information, positioning reference signal PRS indication information, and PRS identification information of a terminal device to an access network device, where the PRS indication information is used to indicate to send a first PRS to the terminal device, the PRS identification information includes an identifier of at least one second PRS, the first PRS has a quasi co-location QCL association relationship with one of the at least one second PRS, and a type of the first PRS does not include a periodic PRS.

In the foregoing technical solution, the first PRS has a QCL association relationship with the one of the at least one second PRS. In this case, the LMF network element may notify the access network device of the identifier of the at least one second PRS. The access network device forwards the identifier of the at least one second PRS to the terminal device. In this way, the terminal device may determine, from the at least one second PRS, the second PRS having the QCL association relationship with the first PRS, to receive the first PRS based on a spatial characteristic parameter of the second PRS. In this way, the terminal device may directly receive the first PRS by using the spatial characteristic parameter of the second PRS, and may not need to re-determine the spatial characteristic parameter used to receive the first PRS.

In some embodiments, the second PRS is a PRS that has been sent to the terminal device. In other words, the terminal device has received the second PRS before receiving the first PRS.

In some embodiments, a type of the second PRS may be a periodic PRS, an aperiodic PRS, or a semi-persistent PRS.

According to a fourth aspect, an embodiment of this application provides a communication apparatus. The apparatus includes: a transceiver unit, a processing unit, and a storage unit. The processing unit is configured to control the transceiver unit to receive and send a signal. The storage unit is configured to store a computer program. The processing unit is configured to invoke and run the computer program from the storage unit, so that the communication apparatus performs the method according to any one of the possible implementations of the method design in the first aspect. The communication apparatus may be an access network device or a component (for example, a chip or a circuit) used for an access network device.

In some embodiments, the transceiver unit may be a transceiver. The processing unit may be a processor. The storage unit may be a memory.

According to a fifth aspect, an embodiment of this application provides a communication apparatus. The apparatus includes: a transceiver unit, a processing unit, and a storage unit. The processing unit is configured to control the transceiver unit to receive and send a signal. The storage unit is configured to store a computer program. The processing unit is configured to invoke and run the computer program from the storage unit, so that the communication apparatus performs the method according to any one of the possible implementations of the method design in the second aspect. The communication apparatus may be a terminal device or a component (for example, a chip or a circuit) used for a terminal device.

In some embodiments, the transceiver unit may be a transceiver. The processing unit may be a processor. The storage unit may be a memory.

According to a sixth aspect, an embodiment of this application provides a communication apparatus. The apparatus includes: a transceiver unit, a processing unit, and a storage unit. The processing unit is configured to control the transceiver unit to receive and send a signal. The storage unit is configured to store a computer program. The processing unit is configured to invoke and run the computer program from the storage unit, so that the communication apparatus performs the method according to the third aspect. The communication apparatus may be an LMF network element or a component (for example, a chip or a circuit) used for an LMF network element.

In some embodiments, the transceiver unit may be a transceiver. The processing unit may be a processor. The storage unit may be a memory.

According to a seventh aspect, an embodiment of this application provides an access network device. The access network device includes a transceiver and a processor. In some embodiments, the access network device further includes a memory. The processor is configured to control the transceiver to send and receive a signal. The memory is configured to store a computer program. The processor is configured to invoke the computer program from the memory and run the computer program, to enable the access network device to perform the method according to any one of the possible implementations of the method design in the first aspect.

According to an eighth aspect, an embodiment of this application provides a terminal device. The terminal device includes a transceiver and a processor. In some embodiments, the terminal device further includes a memory. The processor is configured to control the transceiver to send and receive a signal. The memory is configured to store a computer program. The processor is configured to invoke the computer program from the memory and run the computer program, to enable the terminal device to perform the method according to any one of the possible implementations of the method design in the second aspect.

According to a ninth aspect, an embodiment of this application provides an LMF network element. The LMF network element includes a transceiver and a processor. In some embodiments, the LMF network element further includes a memory. The processor is configured to control the transceiver to receive and send a signal. The memory is configured to store a computer program. The processor is configured to invoke and run the computer program from the memory, so that the LMF network element performs the method according to the third aspect.

According to a tenth aspect, an embodiment of this application provides a communication system. The system includes the access network device according to the seventh aspect, the terminal device according to the eighth aspect, and the LMF network element according to the ninth aspect.

According to an eleventh aspect, an embodiment of this application provides a communication apparatus. The communication apparatus may be an access network device configured to implement the method design in the first aspect or a chip disposed in an access network device. The communication apparatus includes a processor, coupled to a memory, and may be configured to execute a computer program in the memory to implement the method according to any one of the possible implementations of the method design in the first aspect. In some embodiments, the communication apparatus further includes the memory. In some embodiments, the communication apparatus further includes a communication interface, and the processor is coupled to the communication interface.

When the communication apparatus is an access network device, the communication interface may be a transceiver or an input/output interface.

When the communication apparatus is a chip disposed in an access network device, the communication interface may be an input/output interface.

In some embodiments, the transceiver may be a transceiver circuit. In some embodiments, the input/output interface may be an input/output circuit.

According to a twelfth aspect, an embodiment of this application provides a communication apparatus. The communication apparatus may be a terminal device configured to implement the method design in the second aspect or a chip disposed in a terminal device. The communication apparatus includes a processor, coupled to a memory, and may be configured to execute a computer program in the memory to implement the method according to any one of the possible implementations of the method design in the second aspect. In some embodiments, the communication apparatus further includes the memory. In some embodiments, the communication apparatus further includes a communication interface, and the processor is coupled to the communication interface.

When the communication apparatus is the terminal device, the communication interface may be a transceiver or an input/output interface.

When the communication apparatus is the chip configured in the terminal device, the communication interface may be an input/output interface.

In some embodiments, the transceiver may be a transceiver circuit. In some embodiments, the input/output interface may be an input/output circuit.

According to a thirteenth aspect, an embodiment of this application provides a communication apparatus. The communication apparatus may be an LMF network element configured to implement the method design in the third aspect or a chip disposed in an LMF network element. The communication apparatus includes a processor, coupled to a memory, and may be configured to execute a computer program in the memory to implement the method according to any one of the possible implementations of the method design in the third aspect. In some embodiments, the communication apparatus further includes the memory. In some embodiments, the communication apparatus further includes a communication interface, and the processor is coupled to the communication interface.

When the communication apparatus is an LMF network element, the communication interface may be a transceiver or an input/output interface.

When the communication apparatus is a chip disposed in an LMF network element, the communication interface may be an input/output interface.

In some embodiments, the transceiver may be a transceiver circuit. In some embodiments, the input/output interface may be an input/output circuit.

According to a fourteenth aspect, an embodiment of this application provides a computer program product. The computer program product includes computer program code. When the computer program code is run on a computer, the computer is enabled to perform the method according to any one of the possible implementations of the method design in the first aspect.

According to a fifteenth aspect, an embodiment of this application provides a computer program product. The computer program product includes computer program code. When the computer program code is run on a computer, the computer is enabled to perform the method according to any one of the possible implementations of the method design in the second aspect.

According to a sixteenth aspect, an embodiment of this application provides a computer program product. The computer program product includes computer program code. When the computer program code is run on a computer, the computer is enabled to perform the method according to the third aspect.

According to a seventeenth aspect, an embodiment of this application provides a computer-readable medium. The computer-readable medium stores program code. When the computer program code is run on a computer, the computer is enabled to perform the method according to any one of the possible implementations of the method design in the first aspect.

According to an eighteenth aspect, an embodiment of this application provides a computer-readable medium. The computer-readable medium stores program code. When the computer program code is run on a computer, the computer is enabled to perform the method according to any one of the possible implementations of the method design in the second aspect.

According to a nineteenth aspect, an embodiment of this application provides a computer-readable medium. The computer-readable medium stores program code. When the computer program code is run on a computer, the computer is enabled to perform the method according to the third aspect.

BRIEF DESCRIPTION OF DRAWINGS

FIG. 3 is a schematic diagram of a structure of a MAC subheader;

FIG. 4 is a schematic diagram of a structure of another MAC subheader;

DESCRIPTION OF EMBODIMENTS

Figure 1:
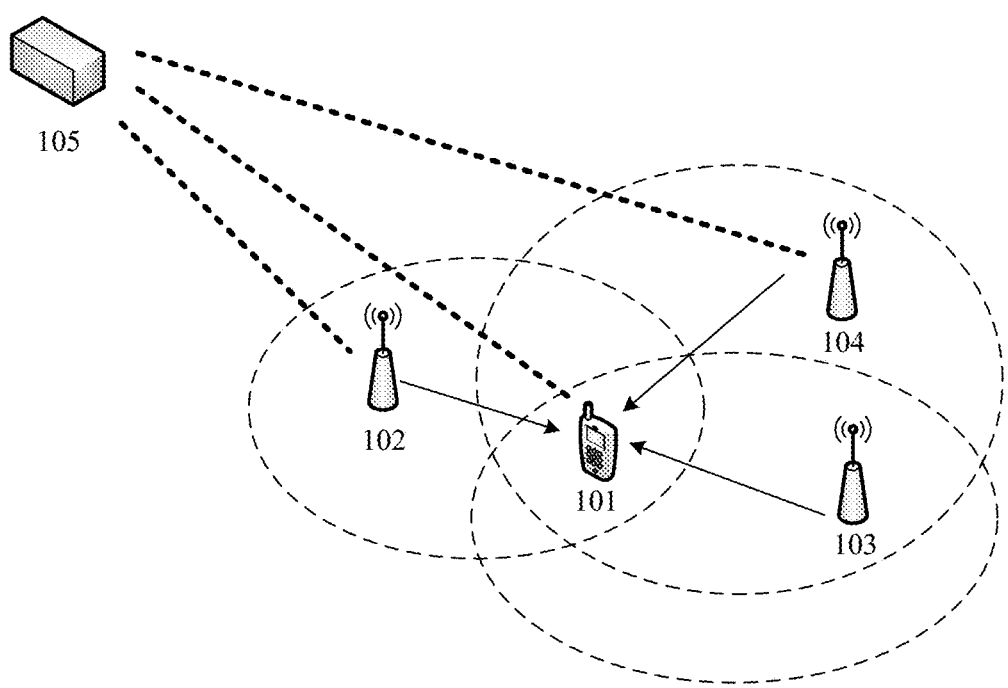
FIG. 1 is a schematic diagram of a wireless communication system 100 applicable to embodiments of this application.

The following describes technical solutions of this application with reference to the accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example", "such as", or the like in the embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

In the embodiments of this application, one of information, signal, message, or channel may be used sometimes. It should be noted that expressed meanings are consistent when differences are not emphasized. "Relevant" and "corresponding" may be interchangeably used sometimes. It should be noted that meanings expressed by the terms are consistent when differences are not emphasized.

In the embodiments of this application, sometimes a subscript, for example, $W_1$, may be written in an incorrect form, for example, W1. Expressed meanings are consistent when differences are not emphasized.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments", that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

In this application, "at least one" means one or more, and "a plurality" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally represents an "or" relationship between the associated objects. "At least one item (piece) of the following" or a similar expression thereof means any combination of the items, including any combination of singular items (pieces) or plural items (pieces). For example, at least one (piece) of a, b, or c may represent: a, b, c, a-b, a-c, b-c, or a-b-c. There may be one single piece of a, b, or c, or there may be a plurality of pieces of a, b, or c.

The technical solutions of the embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, and a 5th generation (5G) system or new radio (NR) system.

A terminal device in the embodiments of this application may also be referred to as user equipment, an access terminal, a subscriber unit, a subscriber station, a mobile station, a remote station, a remote terminal, a mobile device, a user terminal, a terminal, a wireless communication device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). This is not limited in the embodiments of this application.

For example, the terminal device may include: a radio resource control (RRC) signaling interaction module, a media access control (MAC) signaling interaction module, and a physical (PHY) signaling interaction module. The RRC signaling interaction module may be modules, configured to receive and send RRC signaling, of a network device and a terminal device. The MAC signaling interaction module may be modules, configured to receive and send media access control control element (MAC-CE) signaling, of the network device and the terminal device. PHY signaling interaction module may be modules, configured to receive and send uplink control signaling or downlink control signaling and uplink data or downlink data, of the network device and the terminal device.

An access network device in the embodiments of this application may be a device configured to communicate with the terminal device. The access network device may be a base transceiver station (BTS) in a global system of mobile communication (GSM) system or a code division multiple access (CDMA) system, may be a NodeB (NB) in a wideband code division multiple access (WCDMA) system, may be an evolved NodeB (eNB or eNodeB) in an LTE system, or may be an access controller in a cloud radio access network (CRAN) scenario. Alternatively, the access network device may be a relay station, an access point, a vehicle-mounted device, a wearable device, an access network device (for example, a gNB) in a future 5G network, an access network device in a future evolved PLMN network, or the like. This is not limited in the embodiments of this application.

For example, the network device may also include an RRC signaling interaction module, a MAC signaling interaction module, and a PHY signaling interaction module.

In some deployments, the network device may include a centralized unit (CU) and a distributed unit (DU). The network device may further include an active antenna unit (AAU). The CU implements some functions of the network device, and the DU implements some other functions of the network device. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, to implement functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, or an AAU node. In addition, the CU may be classified into a network device in an access network (RAN), or may be classified into a network device in a core network (CN). This is not limited in this application.

For ease of understanding of the embodiments of this application, several terms used in this application are first briefly described.

1. Beam

The beam in an NR protocol may be a spatial filter, or a spatial filter, or a spatial parameter. A beam configured to send a signal may be referred to as a transmit beam (Tx beam), and may be referred to as a spatial domain transmit filter or a spatial domain transmit parameter. A beam configured to receive a signal may be referred to as a receive beam (Rx beam), and may be referred to as a spatial domain receive filter.

The transmit beam may refer to signal strength distribution formed in different directions in space after a signal is transmitted by an antenna, and the receive beam may refer to signal strength distribution in different directions in space of a radio signal received from an antenna.

It should be understood that the foregoing listed representation of the beam in the NR protocol is merely an example, and shall not constitute any limitation on this application. This application does not exclude a possibility of defining another term in a future protocol to represent a same or similar meaning.

In addition, the beam may be a wide beam, a narrow beam, or a beam of another type. A technology for forming the beam may be a beamforming technology or another technology. The beamforming technology may be a digital beamforming technology, an analog beamforming technology, a hybrid digital/analog beamforming technology, or the like. Different beams may be considered as different resources. Same information or different information may be transmitted by using different beams.

In some embodiments, a plurality of beams that have a same communication feature or similar communication features are considered as one beam. One beam may include one or more antenna ports, configured to perform transmission of a data channel, a control channel, a sounding signal, and the like. The one or more antenna ports forming the beam may also be considered as one antenna port set.

2. Beam Pairing Relationship

The beam pairing relationship is a pairing relationship between a transmission beam and a reception beam, that is, a pairing relationship between a spatial domain transmit filter and a spatial domain receive filter. A large beamforming gain can be obtained through transmission of a signal between a transmit beam and a receive beam that have a beam pairing relationship.

In some embodiments, a transmit end and a receive end may obtain a beam pairing relationship through beam training. For example, the transmit end may send a reference signal in a beam sweeping manner, and the receive end may also receive the reference signal in the beam sweeping manner. For example, the transmit end may form different directional beams in space in a beamforming manner, and may perform polling on a plurality of different directional beams, to transmit a reference signal by using the different directional beams, so that power of transmitting the reference signal can reach a maximum value in a direction directed by using a transmit beam. The receive end may also form different directional beams in space in the beamforming manner, and may perform polling on a plurality of different directional beams, to receive a reference signal by using the different directional beams, so that power of receiving the reference signal by the receive end can reach a maximum value in a direction directed by using a receive beam.

By traversing each transmit beam and receive beam, the receive end may perform channel measurement based on the received reference signal, and report, through channel state information (CSI) to the transmit end, a result obtained through measurement. For example, the receive end may report, to the transmit end, a part of reference signal resources with large reference signal received power (RSRP), and for example, report an identifier of the reference signal resource, so that the transmit end sends and receives a signal by using a beam pairing relationship with good channel quality during data or signaling transmission.

3. Antenna Port

The antenna port is briefly referred to as a port. A port may be understood as a transmit antenna identified by a receive end, or a transmit antenna that can be spatially distinguished. One antenna port may be configured for each virtual antenna, and each virtual antenna may be a weighted combination of a plurality of physical antennas. Antenna ports may be classified into a reference signal port and a data port based on different carried signals. The reference signal port includes, for example, but is not limited to, a demodulation reference signal (DMRS) port or a non-zero channel state information reference signal (CSI-RS) port.

In the embodiments of this application, the antenna port may be a DMRS port. DMRSs of different DMRS ports may occupy different time-frequency resources, or have different orthogonal cover codes. When the network device indicates a port to the terminal device, the terminal device may receive a DMRS based on the port indicated by the network device, and demodulate a PDCCH or a PDSCH based on the received DMRS.

In addition, a parameter related to the antenna port may be a DMRS port, a DMRS port group, or a DMRS code division multiplexing (CDM) group. The terminal device may determine the DMRS port based on an antenna port indicated in downlink control information (DCI), and further determine the DMRS port group or the DMRS code division multiplexing group to which the DMRS port belongs.

It should be noted that the DMRS port group and the DMRS code division multiplexing group may be understood as being obtained by grouping DMRS ports in different manners. The antenna port, the DMRS port, the DMRS port group, and the DMRS code division multiplexing group may be distinguished by using indexes or identifiers, or may be distinguished by using other information that may be used to distinguish between different ports or different groups. This is not limited in this application.

In the following embodiments, the port and the DMRS port are sometimes used alternately. It should be understood that in the embodiments of this application, the port represents the DMRS port.

4. Quasi Co-Location (QCL)

Quasi co-location may also be referred to as quasi co-site or co-location. The QCL information may also be referred to as QCL assumption information. The QCL information is used to assist in describing receiving beamforming information by the terminal device and a receiving procedure.

The QCL information may be used to indicate a QCL relationship between two reference signals. A target reference signal may generally be a DMRS, a CSI-RS, a positioning reference signal (PRS), or the like. A referenced reference signal or source reference signal may generally be a CSI-RS, a synchronous signal/PBCH block (SSB), a sounding reference signal (SRS), or the like. It should be understood that a tracking reference signal (TRS) is also a type of CSI-RS. It should be understood that the target reference signal may usually be a downlink signal.

The terminal device may consider that spatial characteristic parameters of the two reference signals having a QCL association relationship are the same, so that a spatial characteristic parameter of the target reference signal may be inferred based on an identifier (which may also be referred to as a source reference signal resource index) of the source reference signal.

The spatial characteristic parameter may include one or more of the following parameters: an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmit beamforming of the terminal device, receive beamforming of the terminal device, a spatial channel correlation, transmit beamforming of the network device, receive beamforming of the network device, an average channel gain, an average channel delay (average delay), delay spread, doppler spread, a doppler shift, a spatial receiving parameter (spatial Rx parameters), or the like.

The foregoing angles may be decomposition values at different dimensions or a combination of decomposition values at different dimensions. The antenna ports may be antenna ports having different antenna port numbers, antenna ports that have a same antenna port number and that are used to send or receive information at different time points, on different frequencies, and/or on different code domain resources, and/or antenna ports that have different antenna port numbers and that are used to send or receive information at different time points, on different frequencies, and/or on different code domain resources.

The spatial characteristic parameters describe a characteristic of a spatial channel between an antenna port for the source reference signal and an antenna port for the target reference signal, and help the terminal device complete receive-side beamforming or a receiving processing process based on the QCL information. It should be understood that, the terminal device may receive the target reference signal based on information about a receive beam for the source reference signal indicated by the QCL information. The spatial characteristic parameters further help the terminal device complete transmit-side beamforming or a transmission processing process based on the spatial relationship information. It should be understood that the terminal device may transmit the target reference signal based on information about a transmit beam for the source reference signal indicated by the spatial correlation information.

Four types of QCLs are defined in an existing standard. The network device may configure one or more types of QCLs for the terminal device. For example, the QCL types configured by the network device for the terminal device may be a type A and a type D or, the QCL types configured by the network device for the terminal device may be a type C and a type D:

QCL type A: a doppler shift, doppler spread, an average delay, and delay spread

QCL type B: a doppler shift and doppler spread

QCL type C: an average delay and a doppler shift

QCL type D: a spatial Rx parameter

When the QCL relationship is a QCL relationship of the type D, the QCL relationship may be considered as spatial QCL. When the antenna ports satisfy the spatial QCL relationship, a QCL relationship (which is referred to as the spatial relationship above) between a port of a downlink signal and a port of a downlink signal or between a port of an uplink signal and a port of an uplink signal may be that the two signals have a same AOA or AOD, and is used to indicate that the two signals have a same receive beam or transmit beam. For another example, a QCL relationship between a downlink signal and an uplink signal or between a port for an uplink signal and a port for a downlink signal may be that there is a correspondence between AOAs and AODs of the two signals, or that there is a correspondence between AODs and AOAs of the two signals. To be specific, beam reciprocity may be used to determine an uplink transmit beam based on a downlink receive beam or determine a downlink receive beam based on an uplink transmit beam.

From a perspective of the transmit end, if two antenna ports are spatially QCLed, it may mean that corresponding beam directions of the two antenna ports are consistent in space. From a perspective of the receive side, if two antenna ports are spatially QCLed, it may mean that the receive side can receive, in a same beam direction, signals sent by using the two antenna ports.

Signals whose transmission is performed on ports having a spatial QCL association relationship may further have corresponding beams. The corresponding beams may include at least one of the following: a same receive beam, a same transmit beam, a transmit beam corresponding to a receive beam (corresponding to a reciprocity scenario), or a receive beam corresponding to a transmit beam (corresponding to a reciprocity scenario).

Signals whose transmission is performed on ports having a spatial QCL association relationship may alternatively be understood as signals received or sent by using a same spatial filter. The spatial filter may be at least one of the following: precoding, a weight of an antenna port, a phase deflection of the antenna port, or an amplitude gain of the antenna port.

Signals whose transmission is performed on ports having a spatial QCL association relationship may alternatively be understood as having corresponding beam pair links (BPLs). The corresponding BPL includes at least one of the following: a same downlink BPL, a same uplink BPL, an uplink BPL corresponding to a downlink BPL, or a downlink BPL corresponding to an uplink BPL.

FIG. 1 is a schematic diagram of a wireless communication system 100 applicable to embodiments of this application. As shown in FIG. 1, the wireless communication system 100 may include at least one access network device, for example, an access network device 102, an access network device 103, and an access network device 104 that are shown in FIG. 1. The wireless communication system 100 may further include at least one terminal device, for example, a terminal device 101 shown in FIG. 1. A plurality of antennas may be configured for each of the network device and the terminal device. The network device and the terminal device may communicate with each other by using a multi-antenna technology.

In addition to the access network device and the terminal device, the wireless communication system 100 may further include a location management function (LMF) network element 105. The LMF network element 105 may estimate a location of the terminal device. The LMF network element 105 may be deployed inside a core network, that is, the LMF network element 105 is also a core network element. The LMF network element 105 may communicate with the access network device through an access and mobility management function (AMF) network element (not shown in the figure). For ease of description, in this embodiment of this application, sending, by the LMF network element, information to the access network device through the AMF network element is referred to as sending, by the LMF network element, information to the access network device for short. In other words, that the LMF network element sends a message to the access network device in this embodiment of this application may be understood as that the LMF network element first sends information to the AMF network element and the AMF network element forwards the information to the access network device.

The LMF network element 105 may further communicate with the terminal device 101. For example, the LMF network element 105 may communicate with the terminal device 101 by using an LTE positioning protocol (LPP).

In some embodiments, some functions of the LMF network element 105, for example, a location management component (LMC), may be integrated in the access network device. For example, the access network device 102, the access network device 103, and the access network device 104 are all integrated into the LMC. That the LMC of the LMF network element integrated in the access network device sends information to the access network device may be considered that the LMF network element sends information to the access network device.

A person skilled in the art may understand that the network apparatus and the terminal apparatus that perform interaction in the wireless communication system 100 and the following communication methods are respectively a network device and a terminal device. For ease of description, descriptions of the network apparatus and the terminal apparatus are used for explanation and description of the solutions. When the network apparatus and the terminal apparatus in some of the following content are components in the network device and the terminal device, the components should not be understood as the network device and the terminal device.

Figure 2:
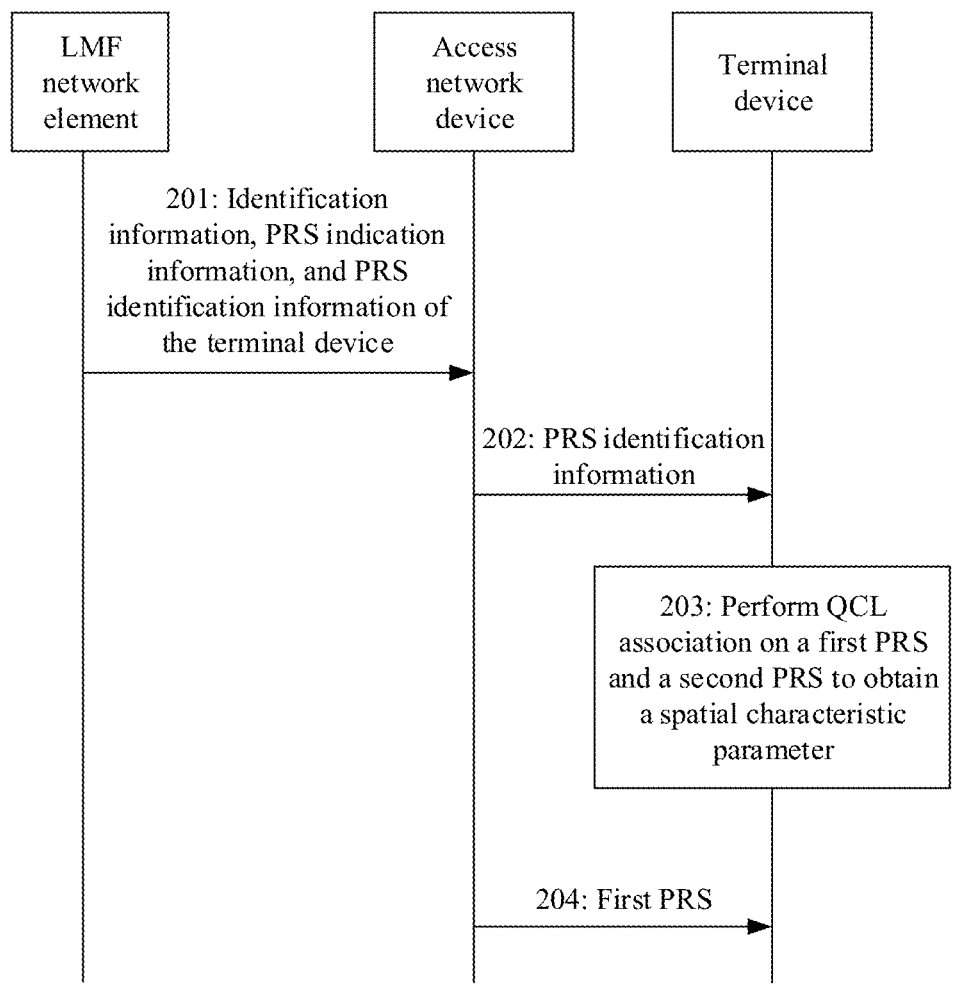
FIG. 2 is a schematic flowchart of a positioning reference signal sending method according to an embodiment of this application.

FIG. 2 is a schematic flowchart of a positioning reference signal sending method according to an embodiment of this application. The method shown in FIG. 2 may be applied to the wireless communication system 100 shown in FIG. 1. For ease of description, the method shown in FIG. 2 is described by using an LMF network element, an access network device, and a terminal device. Operations in the method shown in FIG. 2 may alternatively be performed by a component (for example, a chip or a circuit) in the LMF network element, a component (for example, a chip or a circuit) in the access network device, and a component (for example, a chip or a circuit) in the terminal device.

201: The LMF network element sends identification information, PRS indication information, and PRS identification information of the terminal device to the access network device. Correspondingly, the access network device receives the identification information, the PRS indication information, and the PRS identification information of the terminal device from the LMF network element. In some embodiments, the access network device may be an access network device providing a service for the terminal device. In other words, the access network device may be a service access network device of the terminal device.

The wireless communication system 100 shown in FIG. 1 is used as an example. It is assumed that the access network device providing a service for the terminal device 101 is the access network device 102. In this case, the LMF network element 105 may send identification information, PRS indication information, and PRS identification information of the terminal device 101 to the access network device 102.

The identification information of the terminal device may be information that can be used to identify an identity of the terminal device. For example, the identification information of the terminal device may be an international mobile subscriber identity (IMSI), an international mobile equipment identity (IMEI), a temporary mobile subscriber identity (TMSI), or the like.

The PRS indication information is used to indicate to send a first PRS to the terminal device. A type of the PRS may include a periodic PRS, an aperiodic PRS, a semi-persistent PRS, and the like.

A sending period and a location (that is, a time-frequency resource used to send the PRS) of the periodic PRS have been configured. For example, an enhanced serving mobile location center (E-SMLC) may be configured with the sending period and the location of the periodic PRS. The terminal device is notified of the configured sending period and location by using an information element (IE). After receiving the IE, the terminal device may determine a period and a location that are used to receive the periodic PRS, and receive the PRS at the corresponding period and location.

The type of the first PRS does not include a periodic PRS. In other words, the type of the first PRS another type of PRS other than the periodic PRS. In other words, the type of the first PRS may be an aperiodic PRS or a semi-persistent PRS. The aperiodic PRS and the semi-persistent PRS may be referred to as enhanced PRSs.

The PRS identification information includes an identifier of at least one second PRS. The second PRS is a PRS that has been sent to the terminal device. A type of the second PRS may be a periodic PRS, an aperiodic PRS, or a semi-persistent PRS. The first PRS has a QCL association relationship with one of the at least one second PRS. In other words, a spatial characteristic parameter of the first PRS is the same as a spatial characteristic parameter of one of the at least one second PRS.

An identifier of the second PRS may be a resource identifier (resource ID) of the second PRS.

In some embodiments, the LMF network element may further send a non-zero power (NZP)-channel state information (CSI)-reference signal (RS) resource set IE to the access network device. The NZP-CSI-RS resource set IE may include positioning indication information. If a value of the positioning indication information is a first preset value (for example, the preset value is true (true), 1, or 11), it indicates that parameters (for example, an NZP-CSI-RS resource set, a repetition (repetition) indication, an aperiodic triggering offset (aperiodicTriggeringOffset), and transmission information (tra-Info)) in the NZP-CSI-RS resource set information element are parameters used for location measurement. If a value of the location indication information is a second preset value (for example, false, 0, or 00) or the NZP-CSI-RS resource set IE does not include the positioning indication information, it indicates that parameters in the NZP-CSI-RS resource set IE are parameters used for CSI measurement.

In some embodiments, the LMF network element may further send a location measurement-dedicated IE to the access network device. The location measurement-dedicated IE may include a parameter used for location measurement, for example, an NZP-CSI-RS resource set, a ZP-CSI-RS resource set, a repetition indication, an aperiodic triggering offset (aperiodicTriggeringOffset), or transmission information (tra-Info).

202: The access network device may send the PRS identification information to the terminal device. Correspondingly, the terminal device may receive the PRS identification information.

When the type of the first PRS is an aperiodic PRS, the access network device may send an RRC layer message to the terminal device, where the RRC layer message carries the PRS identification information.

In some embodiments, the RRC layer message may include channel state information (CSI)-aperiodic trigger state list IE. The CSI-aperiodic trigger state list IE may include the PRS identification information.

The CSI-aperiodic trigger state list IE may include a QCL field. The QCL field may be referred to as a qcl-info-r16 field. The qcl-info-r16 field may include the identifier of the at least one second PRS. The qcl-info-r16 field may be associated with an NZP-CSI-RS resource set. The NZP-CSI-RS resource set may include at least one resource. The at least one resource is in a one-to-one correspondence with the identifier of the at least one second PRS included in the qcl-info-r16 field. The NZP-CSI-RS resource set may have an identifier, and each of the at least one resource may have an identifier.

For example, the CSI-aperiodic trigger state list IE may include the following content:

| qcl-info-r16 | PRS-resource-ID 1 |
| | PRS-resource-ID 2 |
| | PRS-resource-ID 3 |

The CSI-aperiodic trigger state list IE described above includes the qcl-info-r16 field, and the qcl-info-r16 field includes identifiers of three second PRSs. The PRS-resource-ID 1, the PRS-resource-ID 2, and the PRS-resource-ID 3 respectively represent the identifiers of the three second PRSs. An NZP-CSI-RS resource set (for example, the NZP-CSI-RS resource set may be an NZP-CSI-RS resource set in the foregoing NZP-CSI-RS resource set IE carrying the positioning indication information) associated with the qcl-info-r16 field includes three resources. The three resources are in a one-to-one correspondence with the identifiers of the three second PRSs. For example, in the three resources, the first resource corresponds to the PRS-resource-ID 1, the second resource corresponds to the PRS-resource-ID 2, and the third resource corresponds to the PRS-resource-ID 3.

It may be understood that in addition to the qcl-info-r16 field, the CSI-aperiodic trigger state list IE may further include another field, for example, a CSI-aperiodic trigger state list (CSI-AperiodicTriggerStateList) field or a CSI-aperiodic trigger state (CSI-AperiodicTriggerState) field. Specific content of these fields are not specifically limited in this embodiment of this application.

In some other embodiments, the RRC layer message may include the CSI-aperiodic trigger state list IE and at least one transmission configuration indicator (TCI)-state IE.

The CSI-aperiodic trigger state list IE may include a QCL field. The QCL field may be referred to as a qcl-info field. The qcl-info field may include a TCI-state identifier list, and the TCI-state identifier list includes at least one TCI-state identifier. The at least one TCI-state identifier is in a one-to-one correspondence with the at least one TCI-state IE. The qcl-info field may be associated with an NZP-CSI-RS resource set. The NZP-CSI-RS resource set may include at least one resource. The at least one resource is in a one-to-one correspondence with the at least one TCI-state identifier included in the qcl-info field.

It may be understood that in addition to the qcl-info field, the CSI-aperiodic trigger state list IE may further include another field, for example, a CSI-aperiodic trigger state list (CSI-AperiodicTriggerStateList) field or a CSI-aperiodic trigger state (CSI-AperiodicTriggerState) field. Specific content of these fields are not specifically limited in this embodiment of this application.

Each TCI-state IE in the at least one TCI-state IE includes a tci-StateID field. The tci-StateID field may include a TCI-state identifier. The TCI-state identifier is a TCI-state identifier, corresponding to the TCI-state IE, in the TCI-state identifier list. Each TCI-state IE further includes a field, and the field may include an identifier of a second PRS. The field may be referred to as a prs field. Each TCI-state IE may further include a qcl-type field. The qcl-type field is used to indicate a type of an associated QCL. For example, the type of the associated QCL may be a QCL type A, type B, type D, type A+D, or type C+D.

It may be understood that in addition to the tci-StateID field, the prs field, and the qcl-type field, the TCI-state IE may further include another field, for example, a qcl-info field or a csi-rs field. Specific content of these fields are not specifically limited in this embodiment of this application.

For example, the CSI-aperiodic trigger state list IE may include the following TCI-state identifier list:

| qcl-info | TCI-State 1 |
| | TCI-State 2 |
| | TCI-State 3 |

The CSI-aperiodic trigger state list IE described above includes the qcl-info field, and the TCI-state identifier list included in the qcl-info field includes a total of three TCI-state identifiers. A TCI-State 1, a TCI-State 2, and a TCI-State 3 represent the three TCI-State identifiers.

A TCI-state IE corresponding to the TCI-State 1 may include the following content:

| tci-StateID | TCI-State 1 |
| prs | PRS-resource-ID 1 |
| qcl-type | type D |

The TCI-state IE described above includes the tci-StateID field, the prs field, and the qcl-type field. The TCI-State identifier included in the tci-StateID field is the TCI-State 1. The identifier of the second PRS included in the prs field is the PRS-resource-ID 1. A type associated with the QCL indicated by the qcl-type field is the type D.

An NZP-CSI-RS resource set (for example, the NZP-CSI-RS resource set may be an NZP-CSI-RS resource set in the foregoing NZP-CSI-RS resource set IE carrying the positioning indication information) associated with the qcl-info field includes three resources. The three resources are in a one-to-one correspondence with three TCI-state identifiers. For example, in the three resources, the first resource corresponds to the TCI-state 1, the second resource corresponds to the TCI-state 2, and the third resource corresponds to the TCI-state 3.

When the type of the first PRS is a semi-persistent PRS, the access network device may send a MAC layer message to the terminal device, where the MAC layer message includes the PRS identification information.

The MAC layer message may include a MAC subheader. The MAC subheader includes the PRS identification information. For example, FIG. 3 is a schematic diagram of a structure of a MAC subheader. The MAC subheader shown in FIG. 3 includes a total of 4+N bytes, where N is an integer greater than or equal to 0. A length of each of the byte may be eight bits.

As shown in FIG. 3, an A/D field in the first byte (namely, the byte 1) in the MAC subheader indicates whether to activate or deactivate an indicated semi-persistent (Semi-Persistent) channel state information (CSI)-reference signal (RS) resource set or an SP CSI-interference measurement (IM) resource set. If a value of the A/D field is 1, the A/D field indicates activation; otherwise, indicates deactivation.

The serving cell ID field indicates an identity of a serving cell using a MAC CE.

A BWP ID field is used to indicate a downlink (DL) bandwidth part (BWP). The MAC control element (CE) uses the BWP as a codepoint of a field "bandwidth part indicator" in DCI.

R in the MAC subheader indicates a reserved field.

An SP CSI-RS resource set ID field includes an index of an NZP-CSI-RS resource set, and the NZP-CSI-RS resource set includes a semi-persistent NZP-CSI-RS resource. The index indicates the semi-persistent NZP-CSI-RS resource set, and this field may be activated or deactivated.

An IM field is used to indicate whether eight bits include an SP CSI-IM resource set identifier domain. If a value of the IM field is 1, it indicates that the MAC CE includes an SP CSI-IM resource set ID field. If a value of the IM field is 0, it indicates that the MAC CE does not include an SP CSI-IM resource set ID field.

The SP CSI-IM resource set ID field includes an index of a CSI-IM resource set. The CSI-IM resource set includes a semi-persistent CSI-IM resource. The index indicates a semi-persistent CSI-IM resource set. This field may be activated or deactivated.

A PRS resource $ID_0$ field to a PRS resource $ID_N$ field are used to indicate the identifier of the at least one second PRS. For example, the PRS resource $ID_i$ field is used to indicate an identifier of an $i^{th}$ second PRS in the at least one second PRS, where i is greater than or equal to 0 and is less than or equal to N.

In some other implementations, the MAC subheader may include a TCI-state IE, and the TCI-state IE includes the PRS identification information.

FIG. 4 is a schematic diagram of a structure of another MAC subheader.

Functions of an A/D field, a serving cell ID field, a BWP ID field, an R field, an IM field, an SP CSI-RS resource set ID field, and an SP CSI-IM resource set ID field in FIG. 4 are the same as the functions of the corresponding fields in the MAC subheader shown in FIG. 3. For brevity, details are not described herein again.

The TCI-state $IE_0$ field to the TCI-state TEN field in the MAC subheader shown in FIG. 4 may be used to carry the PRS identification information. N may be an integer greater than or equal to 0.

In some embodiments, each of the TCI-state $IE_0$ field to the TCI-state TEN field may carry an identifier of a second PRS.

The TCI-state IE includes a tci-StateID field. The tci-StateID field may include a TCI-state identifier. The TCI-state IE further includes a field, and the field may include an identifier of a second PRS. The field may be referred to as a prs field. The TCI-state IE may further include a qcl-type field. The qcl-type field is used to indicate a type of an associated QCL. For example, the type of the associated QCL may be a QCL type A, type B, type D, type A+D, or type C+D.

For ease of description, the manner, shown in FIG. 3, for carrying the PRS identification information is referred to as that the MAC subheader directly carries the PRS identification information; and the manner, shown in FIG. 4, for carrying the PRS identification information is referred to as that the MAC subheader indirectly carries the PRS identification information.

203: The terminal device determines a target second PRS, and performs QCL association on the first PRS and the target second PRS to obtain a spatial characteristic parameter.

After receiving the PRS identification information, the terminal device may determine that the access network device is to send the first PRS to the terminal device. Therefore, the terminal device may perform, based on the PRS identification information, QCL association on the first PRS and one of the at least one second PRS indicated by the PRS identification information, to obtain the spatial characteristic parameter. The spatial characteristic parameter is a second PRS (that is, the target second PRS) that is determined by the terminal device and that has a QCL association relationship with the first PRS.

In some embodiments, the PRS identification information sent by the access network device to the terminal device may include an identifier of only one second PRS. In this case, the terminal device may determine that the second PRS is the target second PRS, and perform QCL association on the first PRS and the second PRS.

In some other embodiments, the PRS identification information may include identifiers of a plurality of second PRSs. In this case, the access network device may further send trigger information to the terminal device, where the trigger information is used to indicate the target second PRS. The trigger information is used to indicate the identifier of the target second PRS. The target second PRS is one of the plurality of second PRSs.

When the type of the first PRS is an aperiodic PRS, the trigger information may be DCI. In other words, the access network device may send the DCI to the terminal device. The DCI is used to indicate the identifier of the target second PRS. The DCI includes the identifier of the first PRS, and the DCI may further be used to indicate that the terminal device is to receive the first PRS.

In some embodiments, the DCI may indicate the identifier of the target second PRS by using an identifier of the NZP-CSI-RS resource set and a resource identifier. In other words, the DCI may include the identifier of the NZP-CSI-RS resource set and the resource identifier, and the identifier of the NZP-CSI-RS resource set and the resource identifier are used to indicate the identifier of the target second PRS.

When the identifier of the at least one second PRS is carried in a field (for example, the qcl-info-r16 field) in the CSI-aperiodic trigger state list IE, if the terminal device receives the DCI, the terminal device may determine one NZP-CSI-RS resource set based on the identifier of the NZP-CSI-RS resource set; and determine, based on the resource identifier, one resource (which may be referred to as a target resource) from the at least one resource included in the NZP-CSI-RS resource set. The terminal device may determine, from the identifier of the at least one second PRS and based on a correspondence between a resource in the NZP-CSI-RS resource set and an identifier of a second PRS, an identifier of a second PRS corresponding to the target resource. The second PRS corresponding to the target resource is the target second PRS. In addition, the terminal device may further determine that the QCL type is a preset type. In other words, if the identifier of the at least one second PRS is carried in one field in the CSI-aperiodic trigger state list IE, the QCL relationship between the first PRS and the target second PRS is a QCL relationship of the preset type.

When an identifier of each of the at least one second PRS is carried in a TCI-state IE, if the terminal device receives the DCI, the terminal device may determine one NZP-CSI-RS resource set based on the identifier of the NZP-CSI-RS resource set; and determine, based on the resource identifier, one resource (which may be referred to as a target resource) from the at least one resource included in the NZP-CSI-RS resource set. The terminal device may determine, from at least one TCI-state identifier and based on a correspondence between a resource in the NZP-CSI-RS resource set and a TCI-state identifier, a TCI-state identifier (which may be referred to as a target TCI-state identifier) corresponding to the target resource. An identifier of a second PRS in a TCI-state IE (which may be referred to as a target TCI-state IE) corresponding to the target TCI-state identifier is the identifier of the target second PRS. In addition, the terminal device may determine that a QCL type indicated by a qcl-type field in the target TCI-state IE is a type of the QCL association relationship between the first PRS and the second PRS.

In some other embodiments, the DCI may include an identifier of a second PRS. The identifier of the second PRS is the identifier of the target second PRS. In other words, the DCI may include the identifier of the target second PRS. In this case, the terminal device directly determines the target second PRS based on the identifier of the second PRS included in the DCI.

In some other embodiments, when an identifier of each of the at least one second PRS is carried in a TCI-state IE, the DCI may further include a TCI-state identifier. An identifier of a second PRS in a TCI-state IE corresponding to the TCI-state identifier is the identifier of the target second PRS. In this case, the terminal device determines the TCI-state IE based on the TCI-state identifier, and determines the identifier of the target second PRS in the TCI-state IE.

When the type of the first PRS is a semi-persistent PRS, the trigger information may be a MAC CE.

In some embodiments, if a MAC subheader directly carries the PRS identification information, the MAC CE may include the identifier of the first PRS and the identifier of the second PRS. The MAC CE is used to indicate that the terminal device is to receive the first PRS. The MAC CE may further be used to indicate the target second PRS. An identifier of a second PRS included in the MAC CE is the identifier of the target second PRS. The terminal device may determine the target second PRS based on the identifier of the second PRS carried in the MAC CE and from the identifiers of the plurality of second PRSs shown in FIG. 3. In addition, the terminal device may further determine that the QCL type is a preset type. In other words, if the MAC subheader directly carries the PRS identification information, the QCL relationship between the first PRS and the target second PRS is a QCL relationship of the preset type.

In some other embodiments, if the MAC subheader indirectly carries the PRS identification information, the MAC CE may include the identifier of the first PRS and a TCI-state identifier. The MAC CE is used to indicate that the terminal device is to receive the first PRS. The MAC CE may further be used to indicate the target second PRS. The target second PRS is a second PRS corresponding to the TCI-state identifier included in the MAC CE. After receiving the MAC CE, the terminal device may determine, from a plurality of TCI-state IEs included in the MAC subheader, a TCI-state IE (which may be referred to as a target TCI-state IE) corresponding to the TCI-state identifier in the MAC CE. A TCI-state identifier included in a tci-StateID field in the target TCI-state IE is the same as the TCI-state identifier included in the MAC CE. An identifier of a second PRS included in a prs field in the target TCI-state IE is the identifier of the target second PRS. In addition, the terminal device may determine that a QCL type indicated by a qcl-type field in the target TCI-state IE is a type of the QCL association relationship between the first PRS and the second PRS.

An aperiodic PRS is a PRS triggered by the DCI, and a semi-persistent PRS is a PRS triggered by the MAC CE. Therefore, when determining that the DCI triggers the first PRS (that is, the trigger information received by the terminal device is the DCI), the terminal device may determine that the type of the first PRS is an aperiodic PRS. When determining that the MAC CE triggers the first PRS (that is, the trigger information received by the terminal device is the MAC CE), the terminal device may determine that the type of the first PRS is a semi-persistent PRS.

204: The access network device sends the first PRS to the terminal device. Correspondingly, the terminal device receives the first PRS based on the spatial characteristic parameter.

Spatial characteristic parameters of reference signals having a QCL association relationship may be the same. In this case, the terminal device may determine that the spatial characteristic parameter (that is, the spatial characteristic parameter determined in operation 203) of the first PRS is the same as the spatial characteristic parameter of the second PRS.

An embodiment of this application further provides a communication apparatus. The communication apparatus may be the LMF network element or a chip used for the LMF network element in the embodiment shown in FIG. 2. The communication apparatus may be configured to perform an action performed by the LMF network element in the embodiment shown in FIG. 2.

Figure 5:
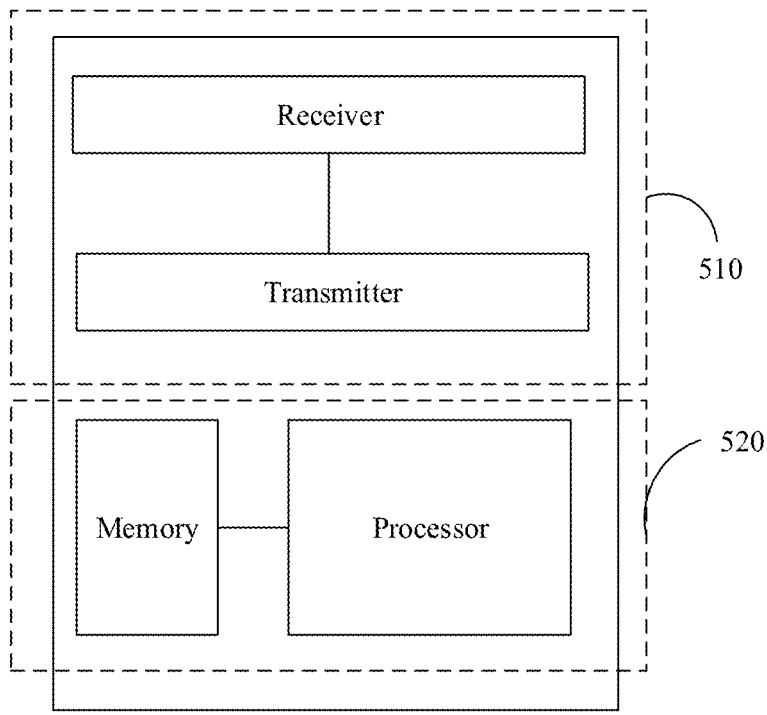
FIG. 5 is a schematic diagram of a structure of a simplified LMF network element.

FIG. 5 is a schematic diagram of a structure of a simplified LMF network element. The LMF network element includes a part 510 and a part 520. The part 510 is mainly configured to receive and send a signal. The part 520 is mainly configured to process the signal received by 510, and so on. The part 510 may be usually referred to as a transceiver unit, a transceiver machine, a transceiver circuit, a transceiver, or the like. The part 520 may be usually referred to as a processing unit, a processor, or the like, and is used by the LMF network element to perform a processing operation on the LMF network element side in the foregoing method embodiments.

A transceiver unit in the part 510 may also be referred to as a transceiver machine, a transceiver, or the like. In some embodiments, a component that is in the part 510 and that is configured to implement a receiving function may be considered as a receiving unit, and a component that is in the part 510 and that is configured to implement a sending function may be considered as a sending unit. In other words, the part 510 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

A control unit in the part 520 may include one or more boards, and each board may include one or more processors and one or more memories. The processor is configured to read and execute a program in the memory to implement a processing function and control the LMF network element. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the transceiver unit in the part 510 is configured to perform the receiving and sending operations on the LMF network element side in the embodiments of this application. For example, the transceiver unit in the part 510 may be configured to perform the sending operation on the LMF network element side in operation 201 shown in FIG. 2. The control unit in part 520 may be configured to determine the information sent by the LMF network element in operation 201. A processing unit in part 520 may be configured to control the transceiver unit to receive and send a signal.

It should be further understood that FIG. 5 is merely an example rather than a limitation, and the LMF network element including the transceiver unit and the processing unit may not depend on the structure shown in FIG. 5.

When the communication apparatus is a chip used for the LMF network element, the chip includes a transceiver unit and a processing unit. The transceiver unit may be an input/output circuit or a communication interface. The processing unit is a processor, a microprocessor, or an integrated circuit integrated on the chip.

An embodiment of this application further provides a communication apparatus. The communication apparatus may be the access network device or a chip used for the access network device in the embodiment shown in FIG. 2. The communication apparatus may be configured to perform an action performed by the access network device in the embodiment shown in FIG. 2.

Figure 6:
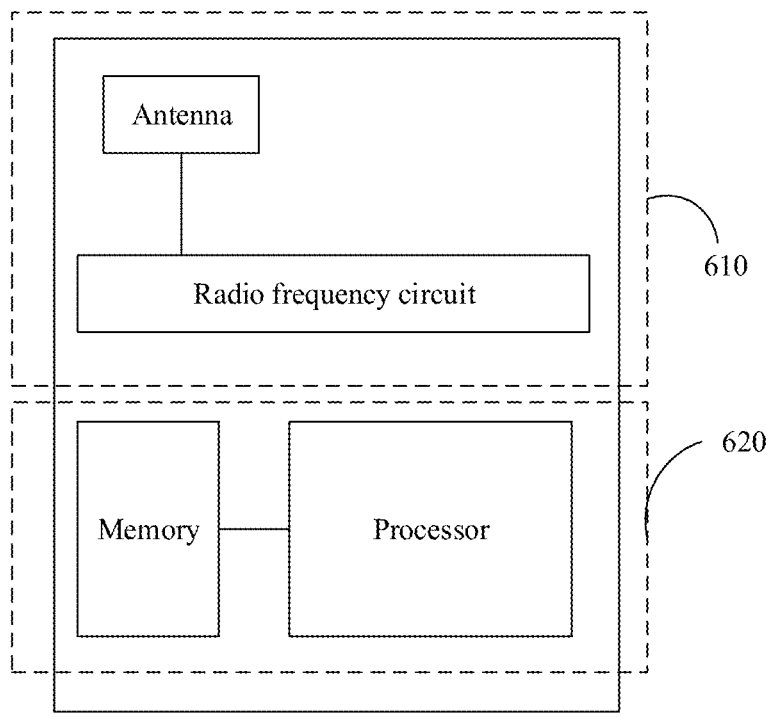
FIG. 6 is a simplified schematic diagram of a structure of an access network device.

FIG. 6 is a simplified schematic diagram of a structure of an access network device. The access network device includes a part 610 and a part 620. The part 610 is mainly configured to receive and send a radio frequency signal and convert the radio frequency signal and a baseband signal. The part 620 is mainly configured to perform baseband processing and control the access network devices. The part 610 may be usually referred to as a transceiver unit, a transceiver machine, a transceiver circuit, a transceiver, or the like. The 620 part is usually a control center of the access network device, and may be usually referred to as a processing unit, and is configured to control the access network device to perform a processing operation on the access network device side in the foregoing method embodiments.

The transceiver unit of the part 610 may also be referred to as a transceiver machine, a transceiver, or the like, and includes an antenna and a radio frequency unit. The radio frequency unit is mainly configured to perform radio frequency processing. In some embodiments, a component that is in the part 610 and that is configured to implement a receiving function may be considered as a receiving unit, and a component that is in the part 610 and that is configured to implement a sending function may be considered as a sending unit. That is, the part 610 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 620 may include one or more boards, and each board may include one or more processors and one or more memories. The processor is configured to read and execute a program in the memory to implement a baseband processing function and control the access network device. If there are a plurality of boards, the boards may be interconnected to enhance a processing capability. In an optional implementation, the plurality of boards may share one or more processors, or the plurality of boards may share one or more memories, or the plurality of boards may simultaneously share one or more processors.

For example, in an implementation, the transceiver unit in the part 610 is configured to perform the receiving and sending operations on the access network device side in the embodiments of this application. For example, the transceiver unit in the part 610 may be configured to perform the receiving operation on the access network device side in operation 201 shown in FIG. 2, and the transceiver unit in the part 610 may further be configured to perform the sending operations on the access network device side in operation 202 and operation 204. A processing unit in the part 620 is configured to determine the information sent in operation 202 and operation 204. The processing unit in part 620 may further be configured to control the transceiver unit to receive and send a signal.

For example, the part 610 may be configured to receive identification information, positioning reference signal PRS indication information, and PRS identification information of a terminal device from a location management function LMF network element, where the PRS indication information is used to indicate to send a first PRS to the terminal device, the PRS identification information includes an identifier of at least one second PRS, the first PRS has a quasi co-location QCL association relationship with one of the at least one second PRS, and a type of the first PRS does not include a periodic PRS. The part 610 may further be configured to send the PRS identification information to the terminal device. The part 610 may further be configured to send the first PRS to the terminal device.

In some embodiments, the part 610 is configured to: when the type of the first PRS is an aperiodic PRS, send a radio resource control RRC layer message to the terminal device, where the RRC layer message carries the PRS identification information.

In some embodiments, the RRC layer message includes a channel state information-aperiodic trigger state list information element, and the channel state information-aperiodic trigger state list information element includes the PRS identification information.

In some embodiments, the RRC layer message includes at least one transmission configuration indication state information element, and the identifier of the at least one second PRS is separately carried in the at least one transmission configuration indication state information element.

In some embodiments, the part 610 is further configured to send downlink control information DCI to the terminal device, where the DCI is used to indicate an identifier of a target second PRS, and the target second PRS is the second PRS having the QCL association relationship with the first PRS in the at least one second PRS.

In some embodiments, the part 610 is configured to: when the type of the first PRS is a semi-persistent PRS, send a media access control MAC layer message to the terminal device, where the MAC layer message includes the PRS identification information.

In some embodiments, the MAC layer message includes a MAC subheader, and the MAC subheader includes the PRS identification information.

In some embodiments, the MAC layer message includes a MAC subheader, and the MAC subheader includes at least one transmission configuration indication state information element, and the identifier of the at least one second PRS is separately carried in the at least one transmission configuration indication state information element.

In some embodiments, the part 610 is further configured to send a MAC control element CE to the terminal device, where the MAC CE is used to indicate an identifier of a target second PRS, and the target second PRS is the second PRS having the QCL association relationship with the first PRS in the at least one second PRS.

In some embodiments, the part 610 is further configured to send a non-zero power channel state information reference signal NZP-CSI-RS resource set information element to the terminal device, where the NZP-CSI-RS resource set information element includes positioning indication information, and the positioning indication information is used to indicate that a parameter included in the NZP-CSI-RS resource set information element is used for location measurement.

It should be further understood that FIG. 6 is merely an example rather than a limitation, and the access network device including the transceiver unit and the processing unit may not depend on the structure shown in FIG. 6.

When the communication apparatus is a chip used for the access network device, the chip includes a transceiver unit and a processing unit. The transceiver unit may be an input/output circuit or a communication interface. The processing unit is a processor, a microprocessor, or an integrated circuit integrated on the chip.

In addition, the access network device is not limited to the foregoing form, and may alternatively be in another form, for example, a building baseband unit (BBU) and an adaptive radio unit (ARU), or a BBU and an active antenna unit (AAU); or may be a customer premise equipment (CPE) or another form. This is not limited in this application.

The BBU may be configured to perform the action that is implemented inside the access network device and that is described in the foregoing method embodiments, and a remote radio unit (RRU) may be configured to perform the sending action that is performed by the access network device to the terminal device and that is described in the foregoing method embodiments. For details, refer to the descriptions in the foregoing method embodiments. Details are not described herein again.

Figure 7:
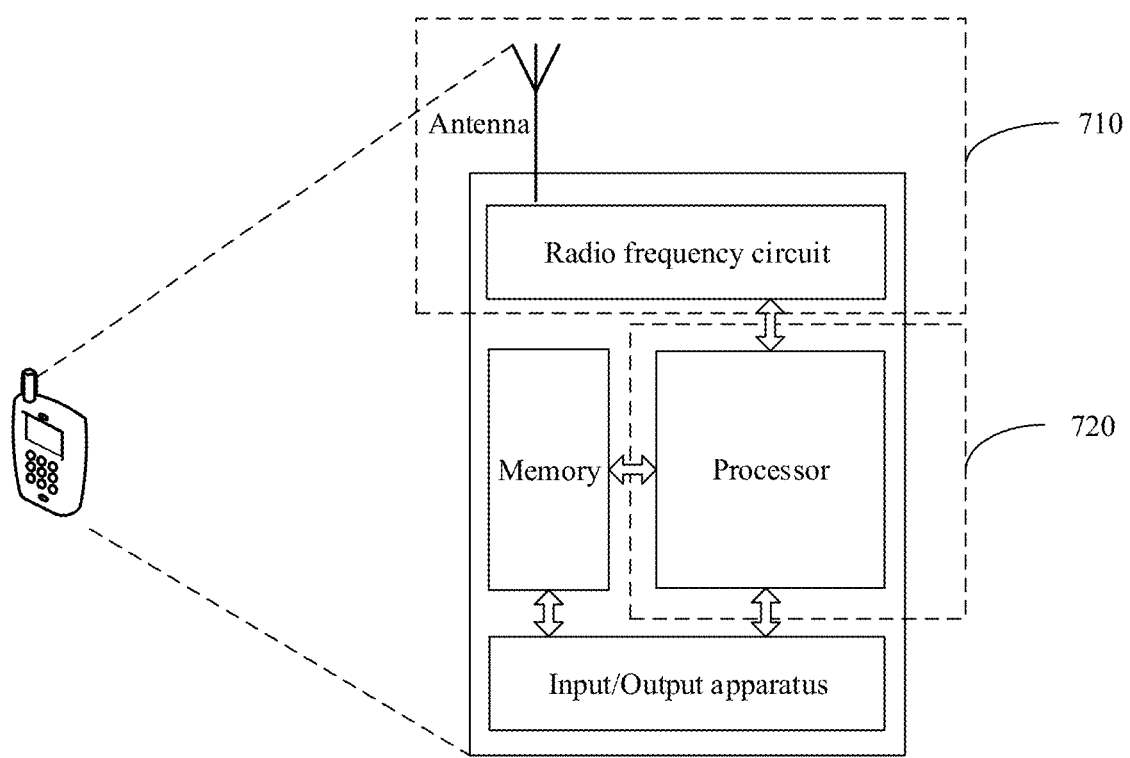
FIG. 7 is a simplified schematic diagram of a structure of a terminal device.

FIG. 7 is a simplified schematic diagram of a structure of a terminal device. For ease of understanding and convenience of figure illustration, an example in which the terminal device is a mobile phone is used in FIG. 7. As shown in FIG. 7, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to: perform conversion between a baseband signal and a radio frequency signal, and process the radio frequency signal. The antenna is mainly configured to send and/or receive a radio frequency signal in a form of an electromagnetic wave. The input/output apparatus, for example, a touchscreen, a display, or a keyboard, is mainly configured to: receive data entered by a user and output data to the user. It should be noted that some types of terminal devices may have no input/output apparatus.

When data is to be sent, the processor performs baseband processing on the to-be-sent data, and outputs a baseband signal to a radio frequency circuit. After performing radio frequency processing on the baseband signal, the radio frequency circuit sends a radio frequency signal outward in an electromagnetic wave form through the antenna. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data. For ease of description, FIG. 7 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in the embodiments of this application.

In the embodiments of this application, the radio frequency circuit and the antenna that has sending and receiving functions may be considered as a transceiver unit of the terminal device, and the processor that has a processing function may be considered as a processing unit of the terminal device.

As shown in FIG. 7, the terminal device includes a transceiver unit 710 and a processing unit 720. The transceiver unit 710 may also be referred to as a transceiver, a transceiver machine, a transceiver apparatus, or the like. The processing unit 720 may also be referred to as a processor, a processing board, a processing module, a processing apparatus, or the like. In some embodiments, a component that is in the transceiver unit 710 and that is configured to implement a receiving function may be considered as a receiving unit, and a component that is in the transceiver unit 710 and that is configured to implement a sending function may be considered as a sending unit. That is, the transceiver unit 710 includes the receiving unit and the sending unit. The transceiver unit may also be sometimes referred to as a transceiver machine, a transceiver, a transceiver circuit, or the like. The receiving unit may also be sometimes referred to as a receiver machine, a receiver, a receiver circuit, or the like. The sending unit may also be sometimes referred to as a transmitter machine, a transmitter, a transmit circuit, or the like.

For example, in an implementation, the processing unit 720 may be configured to perform the processing operation on the terminal device side in the embodiments of this application. For example, the processing unit 720 may be configured to perform the processing action in operation 203 shown in FIG. 2. The transceiver unit 710 may be configured to perform the receiving and sending operations on the terminal device side in the embodiments of this application. For example, the transceiver unit 710 may be configured to perform the receiving operation in operation 202 and operation 204 that are shown in FIG. 2. The processing unit in part 720 may further be configured to control the transceiver unit to receive and send a signal.

For example, the transceiver unit 710 is configured to receive positioning reference signal PRS identification information from an access network device, where the PRS identification information includes an identifier of at least one second PRS, a first PRS has a quasi co-location QCL association relationship with a target second PRS, the target second PRS is one of the at least one second PRS, and a type of the first PRS does not include a periodic PRS. The processing unit 720 is configured to perform QCL association on the first PRS and the target second PRS to obtain a spatial characteristic parameter. The transceiver unit 710 is further configured to receive the first PRS from the access network device based on the spatial characteristic parameter.

In some embodiments, the transceiver unit 710 is configured to receive a radio resource control RRC layer message from the access network device, where the RRC layer message carries the PRS identification information.

In some embodiments, the RRC layer message includes a channel state information-aperiodic trigger state list information element, and the channel state information-aperiodic trigger state list information element includes the PRS identification information.

In some embodiments, the RRC layer message includes at least one transmission configuration indication state information element, and the identifier of the at least one second PRS is separately carried in the at least one transmission configuration indication state information element.

In some embodiments, the transceiver unit 710 is further configured to: before the processing unit performs QCL association on the first PRS and the target second PRS, receive downlink control information DCI from the access network device, where the DCI is used to indicate an identifier of the target second PRS. The processing unit 720 is further configured to determine that the type of the first PRS is an aperiodic PRS.

In some embodiments, the transceiver unit 710 is configured to receive a media access control MAC layer message, where the MAC layer message carries the PRS identification information.

In some embodiments, the MAC layer message includes a MAC subheader, and the MAC subheader includes the PRS identification information.

In some embodiments, the MAC layer message includes a MAC subheader, and the MAC subheader includes at least one transmission configuration indication state information element, and the identifier of the at least one second PRS is separately carried in the at least one transmission configuration indication state information element.

In some embodiments, the transceiver unit 710 is further configured to: before the processing unit performs QCL association on the first PRS and the target second PRS, receive a MAC control element CE from the access network device, where the MAC CE is used to indicate an identifier of the target second PRS; and the processing unit is further configured to determine that the type of the first PRS is a semi-persistent PRS.

In some embodiments, the transceiver unit 710 is further configured to receive a non-zero power channel state information reference signal NZP-CSI-RS resource set information element from the access network device, where the NZP-CSI-RS resource set information element includes positioning indication information, and the positioning indication information is used to indicate that a parameter included in the NZP-CSI-RS resource set information element is used for location measurement.

It should be understood that FIG. 7 is merely an example rather than a limitation, and the terminal device including the transceiver unit 710 and the processing unit 720 may not depend on the structure shown in FIG. 7.

When the communication apparatus is a chip used for the terminal device, the chip includes a transceiver unit and a processing unit. The transceiver unit may be an input/output circuit or a communication interface. The processing unit may be a processor, a microprocessor, or an integrated circuit integrated on the chip.

The chip in the embodiments of this application may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), another programmable logic device, a discrete gate or a transistor logic device, a discrete hardware component, or another integrated chip.

In an implementation process, the operations of the foregoing method may be completed by using an integrated logic circuit of hardware in the processor, or a computer program or instructions in a form of software. The operations of the methods disclosed with reference to the embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations of the foregoing methods in combination with hardware of the processor. To avoid repetition, details are not described herein.

It should be noted that, the processor in the embodiments of this application may be an integrated circuit chip, and has a signal processing capability. In an implementation process, the operations in the foregoing method embodiments may be completed by using an integrated logic circuit of hardware in the processor, or a computer program or instructions in a form of software. The general-purpose processor may be a microprocessor, or the processor may be any conventional processor, or the like. The operations of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations of the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external cache. Through example but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memories of the systems and methods described in this specification are intended to include but are not limited to these memories and a memory of any other proper type.

According to the method provided in the embodiments of this application, this application further provides a computer program product. The computer program product includes computer program code. When the computer program code is run on a computer, the computer is enabled to perform the method in the embodiment shown in FIG. 2.

According to the method provided in the embodiments of this application, this application further provides a computer-readable medium. The computer-readable medium stores program code. When the program code is run on a computer, the computer is enabled to perform the method in the embodiment shown in FIG. 2.

According to the method provided in the embodiments of this application, this application further provides a system. The system includes the one or more terminal devices, one or more access network devices, and the LMF network element that are described above.

A person of ordinary skill in the art may be aware that, units and algorithm operations in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments.

In the several embodiments provided in this application, it should be understood that the disclosed systems, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments of this application.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or a part contributing to an existing technology, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A positioning reference signal sending method, comprising:
   receiving identification information, positioning reference signal (PRS) indication information, and PRS identification information of a terminal device from a location management function (LMF) network element, wherein the PRS indication information is used to indicate to send a first PRS to the terminal device, the PRS identification information comprises an identifier of at least one second PRS, the first PRS has a quasi co-location (QCL) association relationship with one of the at least one second PRS, and a type of the first PRS does not comprise a periodic PRS;
   sending the PRS identification information to the terminal device; and
   sending the first PRS to the terminal device.

2. The method according to claim 1, wherein when the type of the first PRS is an aperiodic PRS, the sending the PRS identification information to the terminal device comprises:

sending a radio resource control (RRC) layer message to the terminal device, wherein the RRC layer message carries the PRS identification information.

3. The method according to claim 2, wherein the RRC layer message comprises a channel state information-aperiodic trigger state list information element, and the channel state information-aperiodic trigger state list information element comprises the PRS identification information; or wherein the RRC layer message comprises at least one transmission configuration indication state information element, and the identifier of the at least one second PRS is separately carried in the at least one transmission configuration indication state information element.

4. The method according to claim 2, further comprising: sending downlink control information (DCI) to the terminal device, wherein the DCI is used to indicate an identifier of a target second PRS, and the target second PRS is the second PRS having the QCL association relationship with the first PRS in the at least one second PRS.

5. The method according to claim 1, wherein when the type of the first PRS is a semi-persistent PRS, the sending the PRS identification information to the terminal device comprises:

sending a media access control (MAC) layer message to the terminal device, wherein the MAC layer message comprises the PRS identification information.

6. The method according to claim 5, wherein the MAC layer message comprises a MAC subheader, and the MAC subheader comprises the PRS identification information; or wherein the MAC layer message comprises a MAC subheader, and the MAC subheader comprises at least one transmission configuration indication state information element, and the identifier of the at least one second PRS is separately carried in the at least one transmission configuration indication state information element.

7. The method according to claim 5, further comprising: sending a MAC control element (CE) to the terminal device, wherein the MAC CE is used to indicate an identifier of a target second PRS, and the target second PRS is the second PRS having the QCL association relationship with the first PRS in the at least one second PRS.

8. The method according to claim 1, further comprising: sending a non-zero power channel state information reference signal (NZP-CSI-RS) resource set information element to the terminal device, wherein the NZP-CSI-RS resource set information element comprises positioning indication information, and the positioning indication information is used to indicate that a parameter comprised in the NZP-CSI-RS resource set information element is used for location measurement.

9. A positioning reference signal receiving method, comprising:

receiving positioning reference signal (PRS) identification information from an access network device, wherein the PRS identification information comprises an identifier of at least one second PRS, a first PRS has a quasi co-location (QCL) association relationship with a target second PRS of the at least one second PRS, and a type of the first PRS does not comprise a periodic PRS;

performing QCL association on the first PRS and the target second PRS to obtain a spatial characteristic parameter; and receiving the first PRS from the access network device based on the spatial characteristic parameter.

10. The method according to claim 9, wherein the receiving the PRS identification information from the access network device comprises:

receiving a radio resource control (RRC) layer message from the access network device, wherein the RRC layer message carries the PRS identification information.

11. The method according to claim 10, wherein the RRC layer message comprises a channel state information-aperiodic trigger state list information element, and the channel state information-aperiodic trigger state list information element comprises the PRS identification information; or wherein the RRC layer message comprises at least one transmission configuration indication state information element, and the identifier of the at least one second PRS is separately carried in the at least one transmission configuration indication state information element.

12. The method according to claim 10, wherein before the performing QCL association on the first PRS and the target second PRS, the method further comprises:

receiving downlink control information (DCI) from the access network device, wherein the DCI is used to indicate an identifier of the target second PRS; and determining that the type of the first PRS is an aperiodic PRS.

13. The method according to claim 9, wherein the receiving the PRS identification information from the access network device comprises:

receiving a media access control (MAC) layer message from the access network device, wherein the MAC layer message carries the PRS identification information.

14. The method according to claim 13, wherein the MAC layer message comprises a MAC subheader, and the MAC subheader comprises the PRS identification information; or wherein the MAC layer message comprises a MAC subheader, and the MAC subheader comprises at least one transmission configuration indication state information element, and the identifier of the at least one second PRS is separately carried in the at least one transmission configuration indication state information element.

15. The method according to claim 13, wherein before the performing QCL association on the first PRS and the target second PRS, the method further comprises:

receiving a MAC control element (CE) from the access network device, wherein the MAC CE is used to indicate an identifier of the target second PRS; and determining that the type of the first PRS is a semi-persistent PRS.

16. The method according to claim 9, further comprising: receiving a non-zero power channel state information reference signal (NZP-CSI-RS) resource set information element from the access network device, wherein the NZP-CSI-RS resource set information element comprises positioning indication information, and the positioning indication information is used to indicate that a parameter comprised in the NZP-CSI-RS resource set information element is used for location measurement.

17. A communication apparatus, comprising:
a receiver, configured to receive positioning reference signal (PRS) identification information from an access network device, wherein the PRS identification information comprises an identifier of at least one second PRS, a first PRS has a quasi co-location (QCL) association relationship with a target second PRS of the at least one second PRS, and a type of the first PRS does not comprise a periodic PRS; and a processor, configured to perform a QCL association on the first PRS and the target second PRS to obtain a spatial characteristic parameter, wherein the receiver is further configured to receive the first PRS from the access network device based on the spatial characteristic parameter.

18. The communication apparatus according to claim 17, wherein:

the receiver is further configured to receive downlink control information (DCI) from the access network device, wherein the DCI is used to indicate an identifier of the target second PRS; and the processor is further configured to determine that the type of the first PRS is an aperiodic PRS.

19. The communication apparatus according to claim 17, wherein:

the receiver is further configured to receive a media access control (MAC) control element (CE) from the access network device, wherein the MAC CE is used to indicate an identifier of the target second PRS; and the processor is further configured to determine that the type of the first PRS is a semi-persistent PRS.

20. The communication apparatus according to claim 17, wherein:

the receiver is further configured to receive a non-zero power channel state information reference signal (NZP-CSI-RS) resource set information element from the access network device, wherein the NZP-CSI-RS resource set information element comprises positioning indication information, and the positioning indication information is used to indicate that a parameter comprised in the NZP-CSI-RS resource set information element is used for location measurement.

\* \* \* \* \*